Sept. 9, 1958 B. D. LOUGHLIN 2,851,517

COLOR-TELEVISION SIGNAL-TRANSLATING APPARATUS

Filed Aug. 23, 1951

6 Sheets-Sheet 1

INVENTOR.
BERNARD D. LOUGHLIN

BY Laurence B. Dodds

ATTORNEY

COLOR-TELEVISION SIGNAL-TRANSLATING APPARATUS

Filed Aug. 23, 1951

INVENTOR.
BERNARD D. LOUGHLIN

BY Laurence B. Dodds

ATTORNEY

INVENTOR.
BERNARD D. LOUGHLIN
BY Lawrence B. Dodds
ATTORNEY

Sept. 9, 1958 B. D. LOUGHLIN 2,851,517

COLOR-TELEVISION SIGNAL-TRANSLATING APPARATUS

Filed Aug. 23, 1951 6 Sheets-Sheet 4

INVENTOR.
BERNARD D. LOUGHLIN
BY Laurence B. Dodds
ATTORNEY

INVENTOR.
BERNARD D. LOUGHLIN
BY Laurence B. Dodds
ATTORNEY

Sept. 9, 1958 B. D. LOUGHLIN 2,851,517

COLOR-TELEVISION SIGNAL-TRANSLATING APPARATUS

Filed Aug. 23, 1951 6 Sheets-Sheet 6

INVENTOR.
BERNARD D. LOUGHLIN
BY Laurence B. Dodds
ATTORNEY

United States Patent Office 2,851,517

Patented Sept. 9, 1958

2,851,517

COLOR-TELEVISION SIGNAL-TRANSLATING APPARATUS

Bernard D. Loughlin, Lynbrook, N. Y., assignor to Hazeltine Research, Inc., Chicago, Ill., a corporation of Illinois Application August 23, 1951, Serial No. 243,216

2 Claims. (Cl. 178—5.4)

*General*

Figure 1:
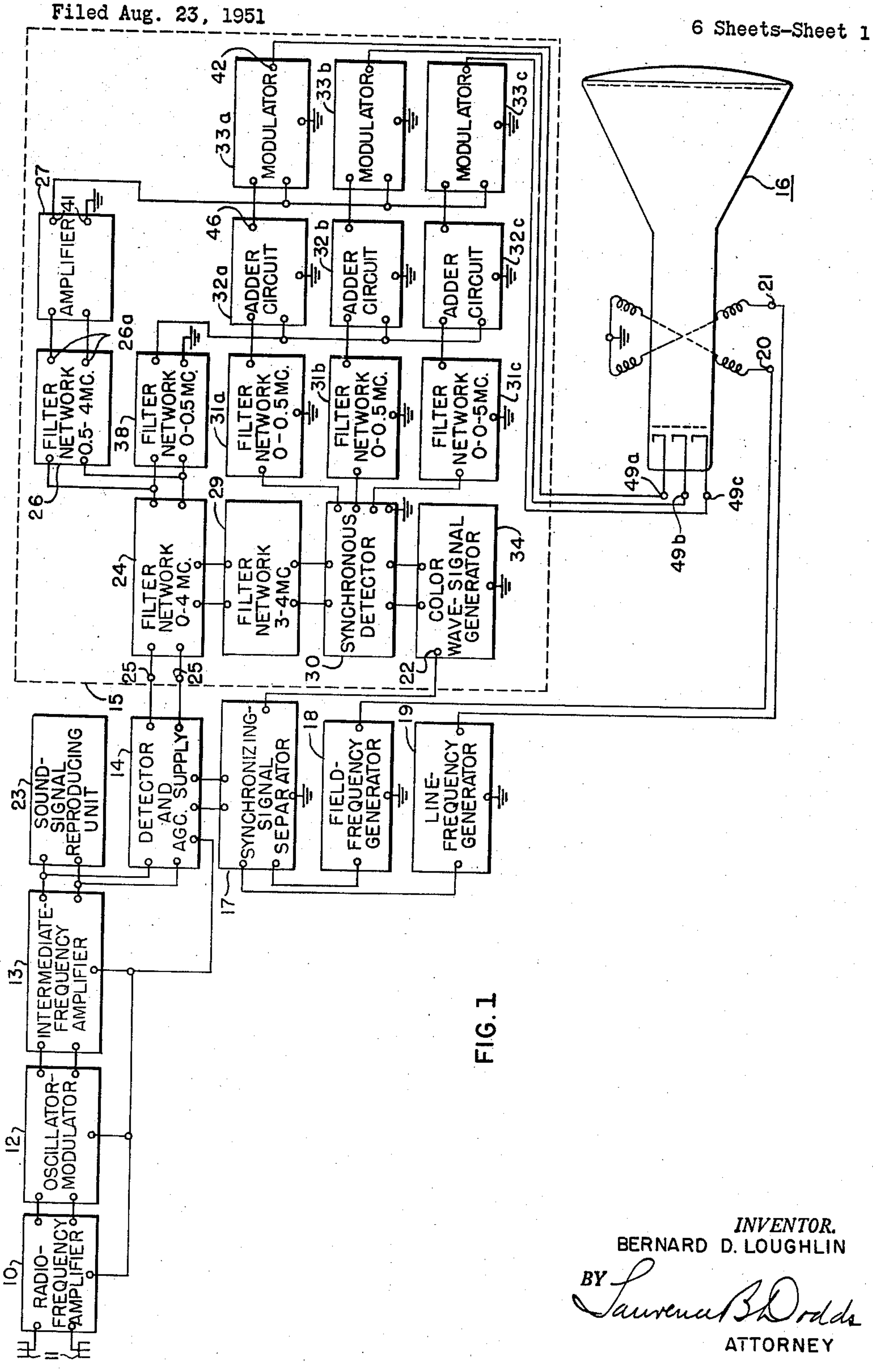

The present invention relates, in general, to color-television signal-translating apparatus and especially to new and improved apparatus for use in color-television receivers which are arranged simultaneously to translate a relatively wide-band brightness component and a relatively narrow band color or chromaticity component. Whereas in prior such apparatus these components are usually combined linearly, resulting in the development of undesired color effects in an image reproduced therefrom, in the apparatus according to the present invention such undesired effects are substantially reduced by combining the components in a nonlinear manner. The present invention has particular application to apparatus in a television system in which the brightness and color components are translated through a common signal-translating channel in an overlapping manner and will be described in such environment.

The televising of a color image comprises in its simplest form an analysis of the image at the transmitter to develop electrical signals related to the brightness and color characteristics thereof and a synthesis of the image at a receiver by combining such developed signals to reproduce the image. Well-known methods of scanning are utilized to analyze and synthesize the image and any of a number of proposed arrangements for developing and utilizing signals related to the basic colors of the image may be used. In televising a monochrome image, it is standard practice to translate through a band-pass filter modulation signals having frequencies as high as 4 megacycles in order to provide adequate definition information of the image. Contemplated broadcast standards for the transmission of information relating to the color characteristics of an image require that the signals carrying the color information also be included in this 4 megacycle band. In order to maintain the same quality of detail for the reproduction of color images as for the reproduction of monochrome images, it appears necessary to continue to translate substantially 4 megacycles of definition information, usually referred to as brightness information in a color-television system, and to translate approximately 2 megacycles of additional information related to the color of the image. To achieve such a result, systems have been proposed which translate the color components interleaved with the upper frequencies of the brightness component. The theory of such systems is more fully described in an article entitled "Comparative analysis of color TV systems" by Arthur V. Loughren and Charles J. Hirsch, "Electronics," February 1951, pages 92–96, inclusive.

One such system is the so-called "dot-sequential" band sharing type of system described more fully in an article entitled "A six-megacycle compatible high-definition color television system," RCA Review, December 1949, pages 504–524, inclusive. In this system, the signals representative of the color characteristics of the image, specifically signals representative of the green, red and blue colors of the image, are combined at the transmitter to form a wide-band signal having frequencies up to 4 megacycles and representing the brightness or definition of the image. In addition, each of these signals is limited to a frequency band of the order of 1.5 megacycles, and these narrower band signals are then utilized individually to modulate a subcarrier wave signal which is equivalent to three subcarrier wave signals each having a frequency of approximately 3.5 megacycles but differing in phase by 120°. The phase and amplitude of the resulting composite type of modulated subcarrier are related to the hue and saturation of the color characteristics of the image and the subcarrier, including its lower side band and part of the upper side band, is then translated through the 4 megacycle video-frequency pass band of the system in an overlapping relation with at least some of the 4 megacycle brightness components.

Another proposed band sharing type of system is described in an article by R. B. Dome entitled "Frequency-interlace color television," "Electronics," September 1950, pages 70–75, inclusive, which utilizes the color-signal components directly in the 0–4 megacycle pass band or as modulation components of subcarrier wave signals having different wave-signal frequencies. The component representative of the green color of the image is limited to a band of one megacycle and is translated through the 0–4 megacycle pass-band filters as the 0–1 megacycle portion of the brightness signal. The 1–4 megacycle signals, representing the mixed-high brightness components, are composed of the combination of the 1–4 megacycle portions of the green, red and blue components. The 0–1 megacycle portion of the component representative of red modulates a 3.5 megacycle subcarrier wave signal which is then translated in an interleaved manner with the 0–4 megacycle signal through the 0–4 megacycle pass-band filters. Similarly, the low-frequency component representative of blue is limited to a bandwidth of 0.25 megacycle and modulates a 4 megacycle subcarrier wage signal which is then translated in an interleaved manner with the 0–4 megacycle signal through the 0–4 megacycle pass-band filter. Thus, it is seen that in this system a wide-band signal of 0–4 megacycles is used to translate the brightness information relating to an image and relatively narrower bandwidth color-component signals are utilized to translate the chromaticity information, the color components being translated through the same pass band as the brightness components in an interleaved manner.

In the above-described systems, signals having a total effective bandwidth of substantially 6 megacycles, that is, 4 megacycles of brightness information and 2 megacycles of color information are effectively translated through a 4 megacycle pass band by causing the information relating to the chromaticity of the image to be interleaved with the higher frequency components of the brightness information. The manner of effecting this interleaving is more fully described in the article in "Electronics" of February 1951, referred to above. It is seen that the mixed-high signal which occupies the high-frequency portion of this pass band is not an independent signal since it is composed of high-frequency components of each of the color signals and that, in order for such signals to be translated independently, separate 4 megacycle pass bands for each color signal would be required, resulting in a 12 megacycle pass band. It is not practical to utilize a 12 megacycle pass band in broadcast color-television systems and, therefore, the spectrum economy previously discussed herein is employed. As is to be expected, such spectrum economy does result in certain problems and limitations. Due to the dependence of the mixed-high component on each of the color signals, undesired cross-talk effects between these color signals tend to occur and appear in the reproduced image. These effects are more readily understandable when one of the previously considered systems is more thoroughly analyzed.

In the so-called "dot-sequential" system, three independent color signals are obtainable only from the double modulation side band of the color subcarrier wave signal. The color subcarrier is capable of translating two independent portions of information as amplitude and phase modulation thereof or as amplitude modulation of quadrature components of the subcarrier. These information portions in the system being described relate to the hue and saturation of the color signals. With respect to a single modulation side band of the subcarrier wave signal, the phase and amplitude modulation thereof are not distinguishable and thus there is a tendency for cross talk between these color-signal components to occur. A complete analysis of the "dot-sequential" type signal translated through a 4 megacycle channel and including a 3.5 megacycle subcarrier modulated by 1.5 megacycle color signals indicates that three independent color signals are obtainable with bandwidths of only 0–.5 megacycle and that over the range of 0.5–1.5 megacycles of the derived color signals only two independent pieces of information can be translated. Over the remainder of the 0–4 megacycle range of the original video signal, specifically, the mixed-high region from 1.5 megacycles to 4 megacycles, only one piece of information may be translated. Therefore, over the 0.5–1.5 and 1.5–4.0 megacycle portions of the 4 megacycle spectrum of the original video signal in which ranges the three color signals cannot be translated in an independent manner, color cross talk tends to occur. The manner in which the information occurring in the latter portions is utilized affects the visibility of the cross-talk effects present therein. Previous arrangements have been suggested which reduce the visibility of the undesired cross talk, specifically, in applicant's copending application Serial No. 159,212, filed May 1, 1950, entitled Constant Luminance Color-Television System, now Patent No. 2,773,929, granted December 11, 1956, and copending application Serial No. 207,154, filed January 22, 1951, and now abandoned. One feature of the present invention is directed to other apparatus for further diminishing the effect of this cross talk.

In addition to the characteristics just described, in systems of the type being discussed which use interleaving and band sharing of the brightness and color signals, the different subcarrier wave signals developed for the purpose of effecting the transmission of the color-signal information are undesired signals in any pass band provided for the translation of information relating only to the brightness or detail of the image. Due to nonlinearities in the signal-translating channels of the system, these subcarrier wave signals tend to produce undesirable brightness fluctuations in the image. These undesired brightness effects are a direct result of the periodic fluctuations of the modulation components of the subcarrier wave signal, the latter fluctuations causing spurious brightness variations in the image, particularly in those areas of the image which have saturated colors. The reproduced image tends to have improper color saturation unless the subcarrier wave signals are eliminated from the brightness channel. Such signals together with their side bands might be effectively eliminated from the brightness channel by suitable shunting means, such as by-pass filters. However, such filters would also eliminate some portion of the brightness signals and would thus tend to reduce the detail in the reproduced image. Therefore, it is preferable not to use such filters. The present invention is also directed to apparatus for diminishing the effects of the subcarrier wave signals on the brightness of the reproduced image.

In general and without any limitation as to the scope thereof, the present invention relates to apparatus for combining with one or more of the low-frequency color signals mixed-high brightness signals in proportion to the energy content of the low-frequency color signal and not in a linear additive manner as in color-television systems heretofore proposed. Since in accordance with the invention the amplitude of the mixed-high frequency signal utilized in each color channel varies with the energy of the color signals in each channel, the mixed-high frequency signal is effectively utilized as a high-frequency color signal and not as a brightness signal having the same amplitude in each color channel. The invention also relates to apparatus for effectively reducing the undesired color fluctuations caused by amplitude fluctuations of the color subcarrier wave signal resulting from brightness changes in the image while the color thereof remains constant. The latter apparatus is arranged to prevent any of these brightness changes from affecting the amplitude of th color subcarrier wave signal by effectively dividing the modulated color subcarrier wave signal by a signal related to the brightness of the image.

It is an object of the present invention, therefore, to provide a new and improved color-television signal-translating apparatus which avoids the aforementioned limitations of prior color-television apparatus.

It is another object of the present invention to provide a new and improved color-television signal-translating apparatus in which the undesirable intermodulation of the brightness and color components of a composite video-frequency signal are substantially reduced.

It is still another object of the present invention to provide in a color-television receiver a new and improved signal-translating apparatus in which the mixed-high brightness component is utilized to develop the detail of a reproduced image for each of the basic colors only in proportion to the magnitude of each of the color signals representing the basic colors.

It is an additional object of the present invention to provide in a color-television receiver a new and improved signal-translating apparatus in which the effect of color cross talk caused by brightness changes is substantially reduced.

It is also an object of the present invention to provide in a color-television receiver a new and improved signal-translating apparatus in which the effect of variations in amplitude of the color subcarrier wave signal on the brightness characteristic of a reproduced image is substantially reduced.

It is still an additional object of the present invention to provide in a color-television receiver a new and improved signal-translating apparatus in which the mixed-high signals are effectively utilized as high-frequency color signals.

In addition it is an object of the present invention to provide in a color-television system a new and improved signal-translating apparatus in which the nonindependent video-frequency signals are combined with the independent video-frequency signals in such a manner as to reduce the visibility of color cross talk.

For a better understanding of the present invention, together with other and further objects thereof, reference is had to the following description taken in connection with the accompanying drawings, and its scope will be pointed out in the appended claims.

Figure 2:
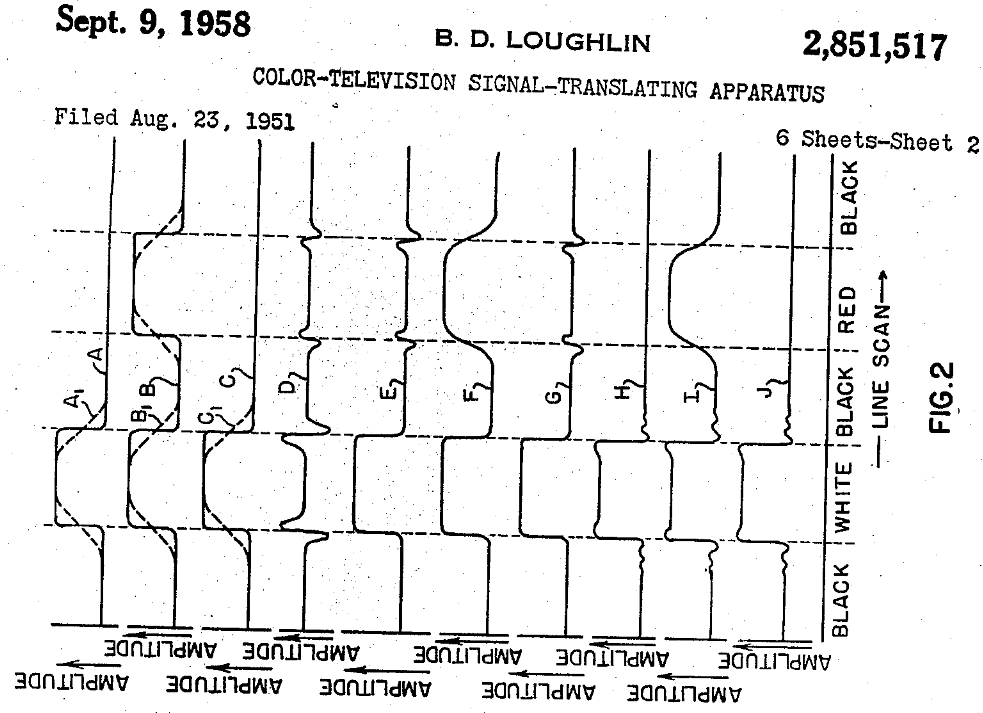
Figure 1A:
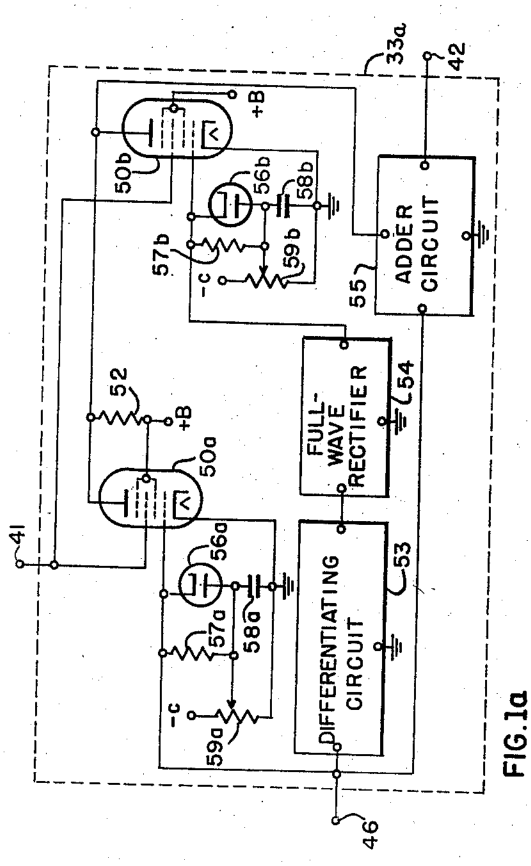
Figure 1B:
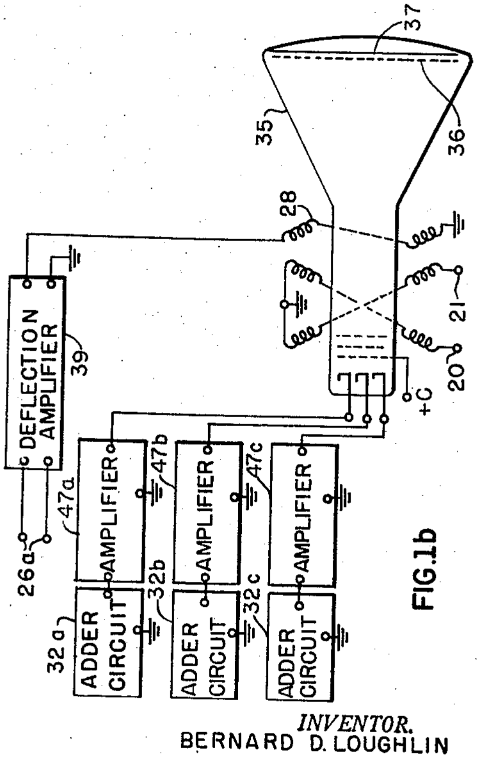
Figures 3, 4B:
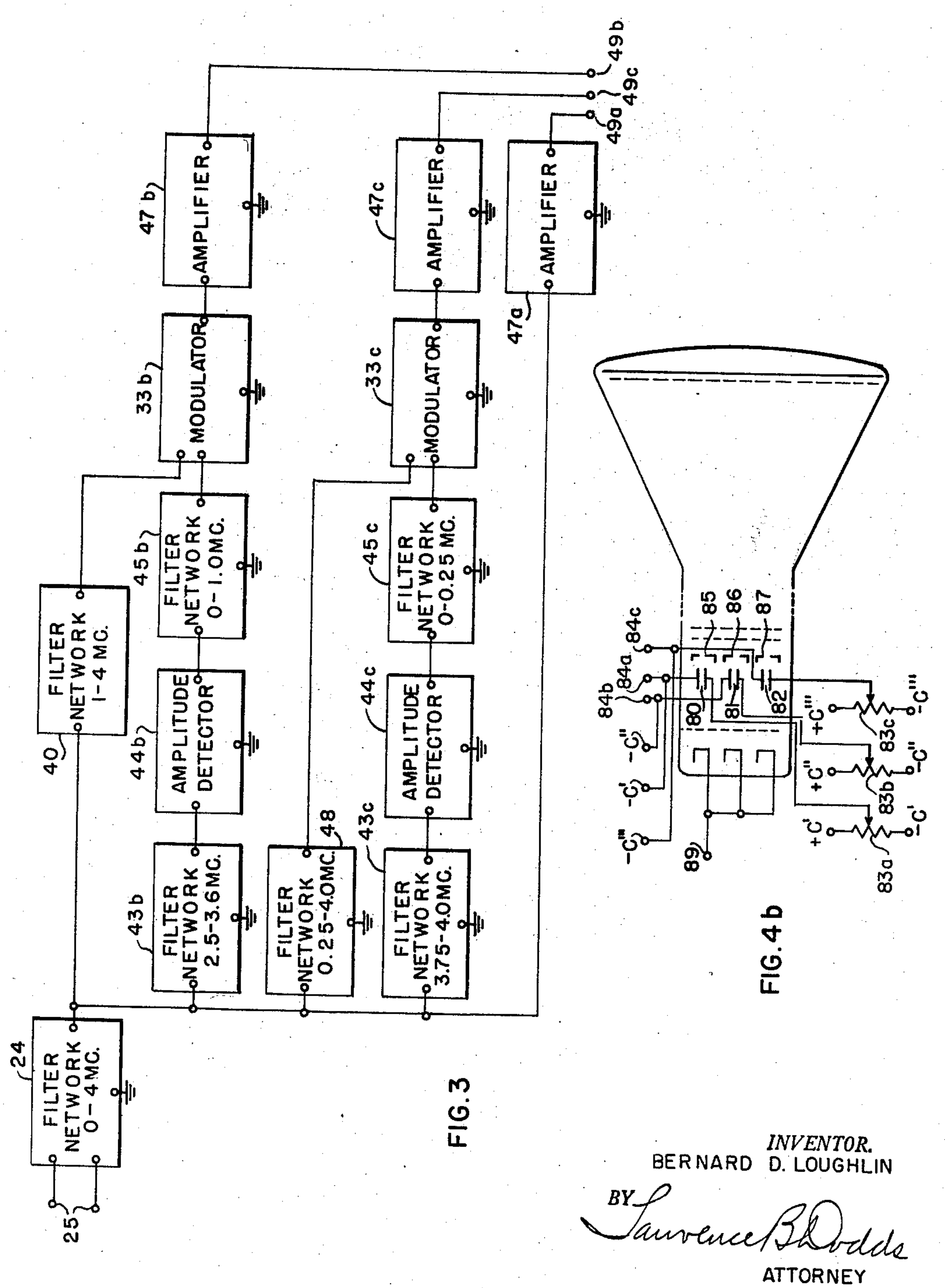
Figure 4:
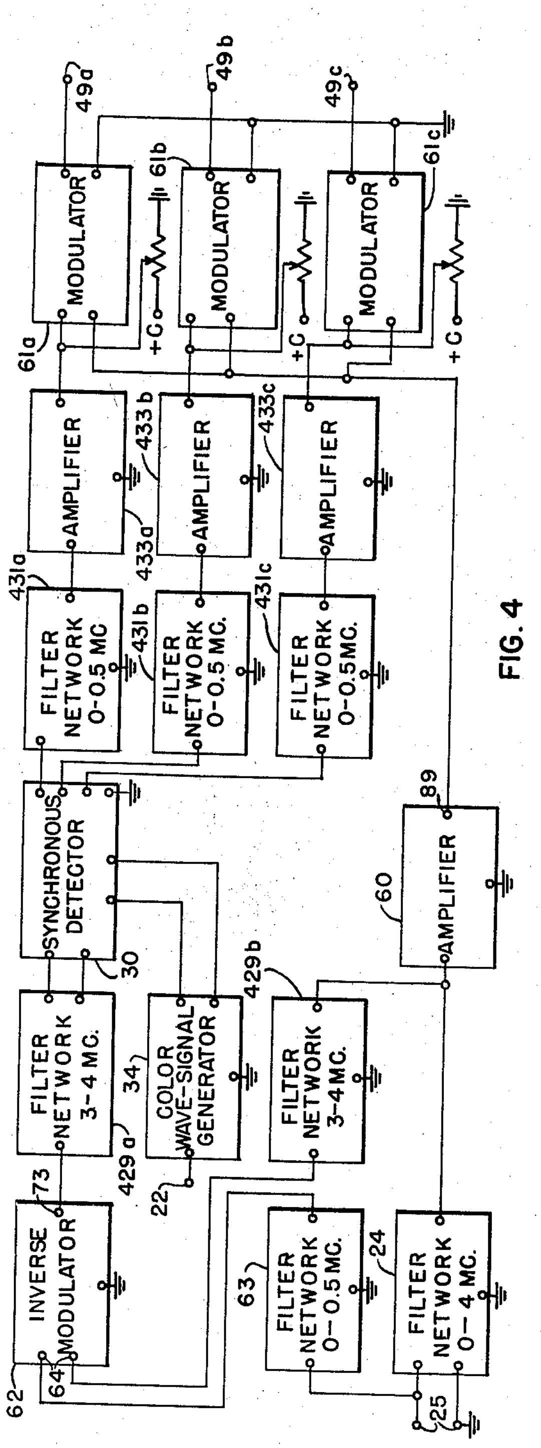
Figure 4A:
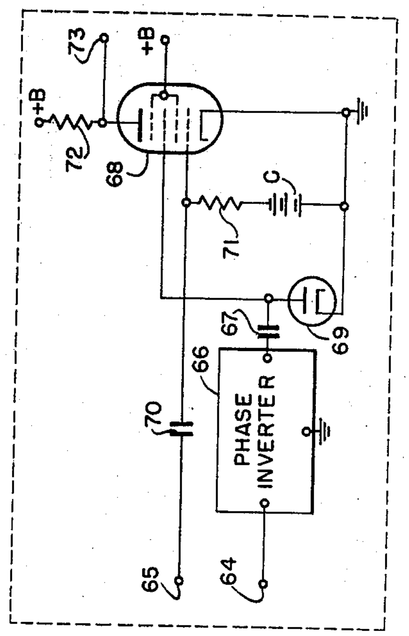
Figure 5:
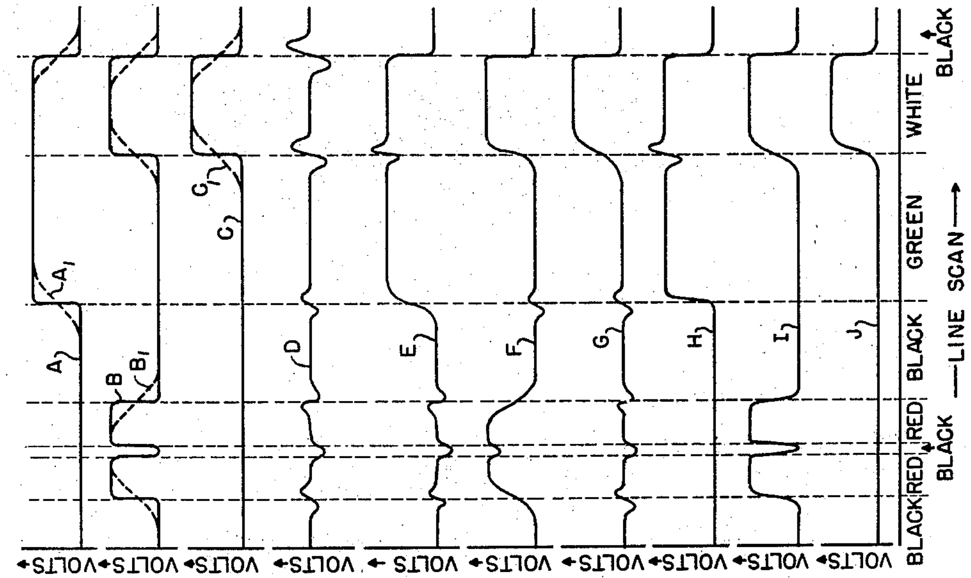
Figure 7A:
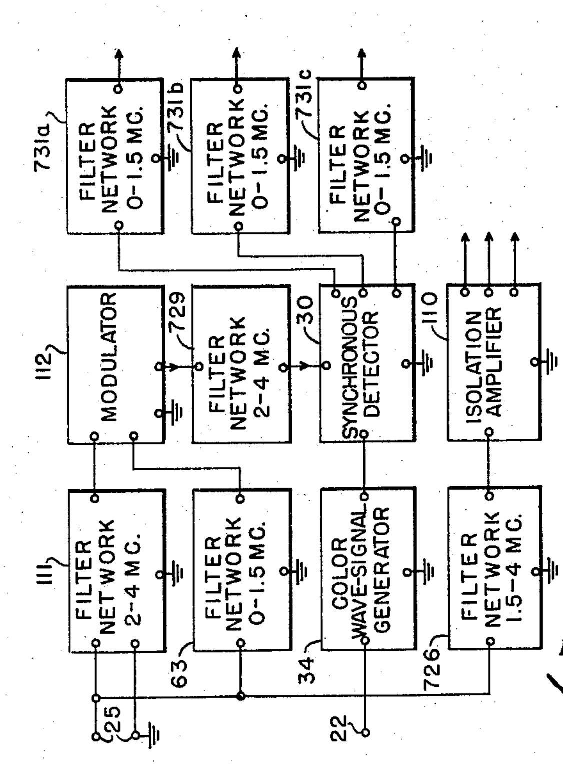
Figure 6:
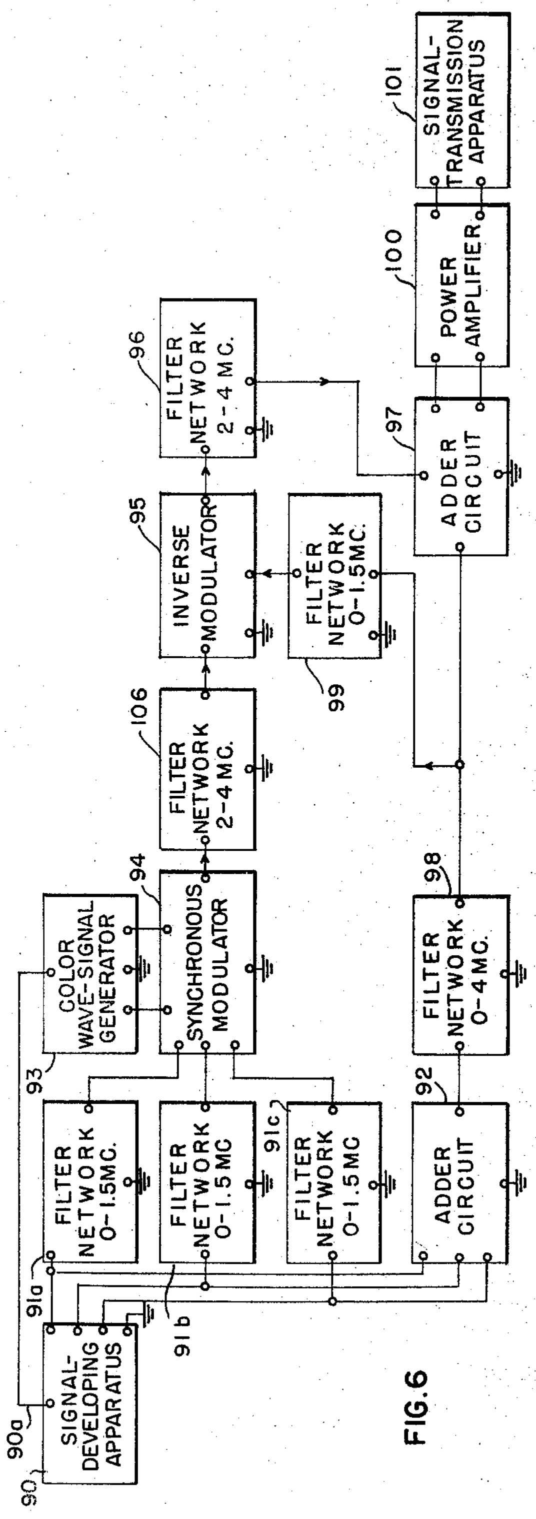
Figure 7:
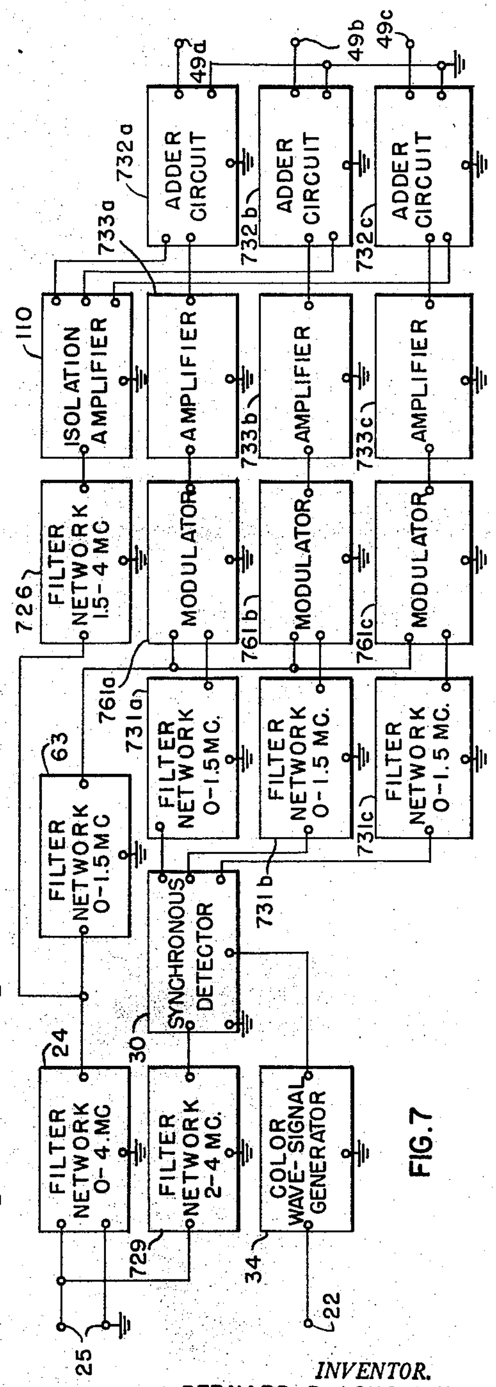

In the drawings, Fig. 1 is a schematic diagram of a color-television receiver embodying the invention in one form and Figs. 1*a* and 1*b* are diagrams of modifications of portions thereof; Fig. 2 is a graph utilized in explaining the operation of the embodiments of Figs. 1, 1*a* and 1*b*; Figs. 3 and 4 are schematic diagrams of other embodiments of the invention; Fig. 4*a* is a circuit diagram of one of the units represented schematically in Fig. 4; Fig. 4*b* is a schematic diagram of a modulator that may be utilized with the embodiment of Fig. 4; Fig. 5 is a graph utilized in explaining the operation of the embodiment of Fig. 4; Fig. 6 is a schematic diagram representing a transmitter useful in practicing one form of the present invention; and Figs. 7 and 7a are schematic diagrams embodying other forms of the present invention.

*General description of the receiver of Fig. 1*

Referring now to Fig. 1 of the drawings, there is represented a receiver for translating a "dot-sequential" type of video-frequency signal having brightness and color components appearing in an interleaved relation in a common pass band. The receiver includes a radio-frequency amplifier 10 of any desired number of stages having its input circuit connected to an antenna system 11, 11. Coupled in cascade with the output circuit of the amplifier 10 in the order named are an oscillator-modulator 12, an intermediate-frequency amplifier 13 of one or more stages, a detector and automatic-gain-control (AGC) supply 14, a color-television signal-translating apparatus 15 to be described in more detail hereinafter and a color image-reproducing device 16 of the cathode-ray tube type. In general the unit 15 is a system for translating a composite video-frequency signal and for deriving therefrom the brightness and color components for utilization in reproducing a color image in the device 16. The latter may be of a conventional type suitable for utilizing basic color signals to reproduce a color image. One suitable device is a triple-gun cathode-ray tube described in an article by RCA Laboratories Division and RCA Victor Division entitled "General description of receivers for the dot-sequential color television system which employ direct-view tri-color kinescopes," RCA Review, June 1950, pages 228–232, inclusive.

There is also coupled to the detector 14 a synchronizing-signal separator 17 having output circuits coupled to terminals 20, 21 of conventional deflection windings of the image-reproducing device 16 through a field-frequency generator 18 and a line-frequency generator 19, respectively. The synchronizing-signal separator 17 also includes an output circuit connected to a terminal 22 of apparatus 15 for a purpose to be described more fully hereinafter. The output circuit of the AGC supply included in the unit 14 is connected to the input circuits of one or more of the tubes of the amplifier 10, the oscillator-modulator 12 and the intermediate-frequency amplifier 13 in a well-known manner.

A sound-signal reproducing unit 23 is also connected to the output circuit of the intermediate-frequency amplifier 13 and may include one or more stages of intermediate-frequency amplification, a sound-signal detector, one or more stages of audio-frequency amplification and a sound-reproducing device.

It will be understood that the various units thus far described with respect to the receiver of Fig. 1, with the exception of the apparatus 15, may be of any conventional construction and design, the details of which are well known in the art, so that a further description of such units is considered unnecessary.

*General operation of the receiver of Fig. 1*

Considering briefly the operation of the receiver of Fig. 1 as a whole but assuming for the moment that the unit 15 is any means for deriving suitable color and brightness components to be utilized in the device 16 a desired modulated color-television wave signal is intercepted by the antenna system 11, 11. The signal is selected and amplified in the amplifier 10 and applied to the oscillator-modulator 12 wherein it is converted into an intermediate-frequency signal. The intermediate-frequency signal is then selectively amplified in the amplifier 13 and applied to the detector 14 where its video-frequency modulation components are derived. One portion of these video-frequency components is applied to the unit 15 wherein the color and brightness components thereof are derived and applied to appropriate control electrodes, specifically the cathodes of the cathode-ray tube in the device 16 in a manner to be described more fully hereinafter to modulate the electron beams therein. The video-frequency signal is also applied to the synchronizing-signal separator 17 wherein the synchronizing-signal components are separated therefrom and are used to synchronize the operation of the field-frequency and line-frequency generators 18 and 19, respectively. The generators 18 and 19 supply signals of saw-tooth wave form which are properly synchronized with reference to the transmitted television signal and are applied to the deflection windings of the tube in the device 16 thereby to deflect the cathode-ray beam or beams in two directions normal to each other to reproduce from the different color signals color images related to the green, red and blue characteristics of the televised image. These color images then form a composite image which is a reproduction of the color image being televised at the transmitter.

The automatic-gain-control or AGC signal derived in the unit 14 is effective to control the amplification of one or more of the units 10, 12 and 13 to maintain the signal input to the detector 14 and to the sound-signal reproducing device 23 within a relatively narrow range for a wide range of received signal intensities.

The sound-signal reproducing device 23 has applied thereto a sound-signal modulated wave signal translated through the units 10, 12 and 13. In the unit 23 the latter wave signal is amplified and detected to derive the modulation components therefrom, these components being further amplified, and reproduced by a sound reproducer in a conventional manner.

*Description of color-television apparatus of Fig. 1*

Referring now in particular to the apparatus 15 embodying one form of the present invention, this apparatus comprises one signal-translating channel responsive to the video-frequency signal derived in the detector 14 for translating a first signal representative of at least a portion of the brightness characteristic of an image. This channel includes a filter network 24 having a pass band of approximately 0–4 megacycles, having an input circuit coupled through a pair of terminals 25, 25 to an output circuit of the detector 14 and having a filter network 26 and an amplifier 27 coupled in cascade with an output circuit thereof. The filter network 26 has a pass band of approximately 0.5–4 megacycles. The output circuit of the amplifier 27 is coupled to individual input circuits of a group of modulators **33*a*, 33*b* and 33*c*** to be considered more fully hereinafter.

The apparatus 15 also includes another signal-translating channel responsive to the video-frequency signal for translating a second signal representative of at least a portion of the color characteristics of an image to be reproduced. More specifically, the other channel includes a filter network 29, having a pass band of approximately 3–4 megacycles, coupled between the network 24 and a synchronous detector 30. The detector 30 includes three output circuits having similar cascade arrangements of units coupled thereto. One such arrangement comprises a filter network **31*a*, having a pass band of approximately 0–0.5 magacycle, coupled to an adder circuit 32*a*. The other two arrangements, each coupled to an output circuit of the unit 30**, individually comprise units similar to those of the first arrangement and designated with similar numbers for the similar units with the suffix letters "*b*" and "*c*," respectively. The channel for translating the second signal may comprise the units 29 and 30 with one or more of the arrangements just described. Specifically, there is a signal-translating channel for each of the color-signal components related to the colors green, red and blue and these channels considered individually or collectively may be considered to comprise the other channel.

The synchronous detector 30 comprises a phase-sensitive detection means described more fully in applicant's copending application Serial No. 164,114, filed May 25, 1950, now Pat. No. 2,774,072, granted Dec. 11, 1956. The detector 30 is arranged to derive from a composite modulated subcarrier wave signal applied thereto from the unit 29, and of the type described previously with reference to the dot-sequential system, the different modulation signals thereof in the individual output circuits of the detector. The adder circuits 32a–32c, inclusive, are of conventional construction and each may comprise a plurality of pentode tubes, an input circuit of each of such pentode tubes in an adder circuit being arranged to have one of the input circuits of the adder circuit individually coupled thereto, the anode circuits of the tubes in an adder circuit being connected in parallel to provide the output circuit of the adder circuit. There is also coupled to an input circuit of the detector 30 a color wave-signal generator 34, specifically a sine-wave generator for developing a 3.5 megacycle sine wave, having a frequency-control input circuit coupled through the terminal 22 to the synchronizing-signal separator 17. A filter network 38, having a pass band of approximately 0–0.5 megacycle is coupled between the network 24 and each of the adder circuits 32a–32c, inclusive.

The signal-translating apparatus of the invention also comprises a signal-multiplying arrangement, specifically a modulator arrangement including an input circuit coupled to one of the signal-translating channels and including means for developing an electron stream, at least one characteristic of the stream being controllable by an individual one of the translated signals to develop an effect on the stream which is representative of at least the multiplication product of the first and the second translated signals. More specifically, the arrangement includes the modulators 33a, 33b and 33c, having input circuits coupled to the signal-translating channel including the amplifier 27 and each having another input circuit coupled to different ones of the adder circuits 32a, 32b and 32c. The output circuits of the modulators 33a–33c, inclusive, are individually coupled to separate electron-beam intensity control circuits of the three electron guns in the image-reproducing device 16.

Fig. 1*a* is a circuit diagram, partially schematic, of a representative one of these modulators. The modulator arrangement includes conventional modulator or mixer tubes 50a and 50b the anodes of which are connected in common through a load resistor 52 to a source of potential +B, and the screen electrodes of which are connected directly to the source +B. Each of the tubes 50a, 50b includes a pair of input circuits, one input circuit for each tube comprising, specifically, the outer signal grid electrode thereof connected to a terminal 41 which is normally connected to the output circuit of a unit such as the amplifier 27. Another input circuit of the tube 50a, including the inner signal grid electrode thereof, is connected to a terminal 46, while a similar input circuit of the tube 50b is connected to terminal 46 through a differentiating circuit 53 and a full wave rectifier 54. The terminal 46 is coupled to the output circuit of a unit such as one of the adder circuits 32a–32c, inclusive. The common output circuit of the tubes 50a, 50b is connected through an adder circuit 55 to to a terminal 42 coupled to one of the electron-beam intensity control circuits in the image-reproducing device 16. The adder circuit 55 has an additional input circuit connected directly to the terminal 46. There are coupled between the control electrode and the cathode of each of the tubes 50a and 50b, similar signal-level control circuits. The signal-level control circuit for the tube 50a includes a diode 56a and a condenser 58a connected in series between the control electrode and the cathode of the tube. A resistor 57a is coupled in parallel with the diode 56a and a biasing voltage divider 59a is coupled between a source of potential −C and the cathode of tube 50a, the adjustable contact thereof being connected to the anode of the diode 56a. The voltage divider 59a is arranged to bias the anode of the diode 56a negatively with respect to ground and the signal-level control network establishes a bias level such that all signals applied to the control electrode of the tube 50a are of a positive-going type.

The differentiating circuit 53 comprises means for developing a derivative of one of the video-frequency components and for applying the developed derivative to one of the modulator tubes, specifically, to the tube 50b to develop therein a resultant control effect on the electron beam thereof. The full wave rectifier 54 may be of a conventional type for deriving a unidirectional control potential from both polarity portions of the signal output of the differentiating circuit 53.

*Explanation of operation of apparatus of Fig. 1*

The signal-translating apparatus 15 of Fig. 1 is arranged to translate a composite video-frequency signal including a composite type of modulated subcarrier wave signal comprising a color component and a brightness component of the type utilized in a dot-sequential system, as previously discussed. More specifically, it is assumed, for simplicity of explantation of the invention, that the brightness component comprises a band of 0–4 megacycles and may be considered as including band portions of 0–0.5 and 0.5–4 megacycles. It is also assumed that the color components are transmitted as double side-band modulation components of a 3.5 megacycle subcarrier, the modulation signals comprising a band of 0–0.5 megacycle. It will be understood that other types of composite video signals may be utilized in accordance with the teachings of the present invention.

A composite video signal of the type described is derived in the detector 14 and applied through the terminals 25, 25 to the filter network 24 through which the composite 0–4 megacycle applied signal is translated. The 0.5–4 megacycle high-frequency portion, sometimes referred to as the mixed-high brightness signal, is translated through the filter network 26, amplified in the unit 27 and applied to each of the modulators 33a–33c, inclusive. A component of the video-frequency signal, having a bandwidth of 3–4 megacycles, and thereby including the modulated subcarrier wave signal and its side bands, is translated through the network 29 and applied to the synchronous detector 30. The detector 30, under the control of a 3.5 megacycle sine-wave signal or control signal developed in the generator 34 and synchronized in phase and frequency with the subcarrier wave signal developed at the transmitter in the system, derives the modulation components of the composite type of subcarrier wave signal translated through the network 29, at the 0°, 120° and 240° phase positions of each cycle of the wave signal. The frequency and phase of the generator 34 are controlled by a control signal generated at the transmitter and derived at the receiver in a circuit such as a synchronizing-signal separator 17. Individual ones of the derived components are applied to different ones of the filter networks 31a, 31b and 31c. The phase relationship of the signals derived in the detector 30 and applied to the units 31a–31c, inclusive, may be of the conventional 0°, 120°, 240° type described in the article in the RCA Review of December 1949, previously referred to, or they may have a phase relationship of 0°, 90° and 180°, as described in applicant's copending application, Serial No. 159,212, previously mentioned. In addition, these signals may be proportioned in terms of their relative luminance, as described in the application just mentioned, or they may be of the equal intensity type described in the publication just referred to.

Each of the derived modulation components, being a color-signal component, is translated through a different one of the cascade arrangements comprising corresponding ones of the filter networks 31a–31c, inclusive, and of the added circuits 32a–32c, inclusive. Each of the color-signal components, comprising a band of 0–0.5 megacycle, combines in the appropriate one of the adder circuits 32a–32c, inclusive, with a brightness component having a bandwidth of 0–0.5 megacycle and translated through the filter network 38. As more fully explained in applicant's copending application Serial No. 164,114, filed May 25, 1950, and entitled "Color-Television System," the component translated through the network 38 includes the low-frequency detail and brightness information, while the components translated through the networks 31a–31c, inclusive, include only the corresponding low-frequency chromaticity information. The combination of these components in the adder circuits 32a–32c, inclusive, develops 0–0.5 megacycle color signals including both chromaticity and brightness information.

Each of these color signals is applied to a different one of the modulators 33a–33c, inclusive, the mixed-high brightness signal comprising the band of 0.5–4 megacycles also being applied to each of these modulators. The operation of a representative one of these modulators will now be described with reference to Fig. 1a.

A 0–0.5 megacycle color signal is applied from one of the adder circuits 32a–32c, inclusive, through the terminal 46 to the control electrode of the tube 50a, to the input circuit of the differentiating circuit 53 and to the input circuit of the adder circuit 55. The signal-level control circuit including the diode 56a is adjusted by means of the voltage divider 59 to cause the applied color signal to vary only in a positive direction from the cutoff bias of the tube 50a. This control circuit acts effectively as a direct-current restorer for the signals applied to the control electrode of the tube 50a. The mixed-high brightness signal is applied from the unit 27 through the terminal 41 to another signal-input electrode of each of the tubes 50a and 50b. The circuit including the tube 50a causes this tube to act, in a conventional manner, as a product modulator responsive to the applied brightness and color signals to cause the 0.5–4 megacycle brightness signal to be modulated by the 0–0.5 megacycle color signal by causing the instantaneous amplitude of the product signal to be proportional to the instantaneous amplitude of the applied color signal. Thus, for example, if the applied color signal has an instantaneous value of 0.1 volt and the instantaneous brightness signal a value of 1 volt, the product signal will have a value proportional to 0.1 volt. The latter signal, being a 0.5–4 megacycle modulated brightness signal is developed across the resistor 52 and is applied to an input circuit of the adder circuit 55 wherein it is additively combined with the 0–0.5 megacycle color-signal component to develop the complete 0–4 megacycle color signal.

Since the inner signal grid electrode of the tube 50a is biased so that all signals applied thereto cause the potential thereof to become more positive and since the outer signal grid of the tube 50a may change potential in either a negative or positive direction, it is possible that some or all of the 0–0.5 megacycle color signal applied to the inner grid may be translated through the tube 50a to add with the modulated brightness signal across the resistor 52 to develop a complete 0–4 megacycle color signal. If the circuit including the tube 50a is designed to operate in such a manner, then the adder circuit 55 may be omitted. The complete color signal is then translated through the terminal 42 to one of the beam-intensity control circuits of the image-reproducing device 16. Each of the modulators 33a–33c, inclusive, of Fig. 1, acts in the manner just described to apply color signals representative of the green, red and blue components of a televised image to the appropriate control circuits in the image-reproducing device 16.

The color signal applied to each of the beam-intensity control circuits in the image-reproducing device 16 is one in which the portion thereof which comprises the independent 0–0.5 megacycle color components determines the intensity of the dependent 0.5–4 megacycle mixed-high signal to be combined therewith to develop the complete 0–4 megacycle color signal. The terms "independent" and "dependent" are employed here in the same sense as previously herein.

The combining of the color component and the brightness component may be said to be effected in a nonlinear manner in so far as the signals are not directly added and the resultant color signal is effective to develop an image in the device 16 in which the previously discussed undesired color effects caused by cross talk are substantially reduced. A more detailed explanation of the reduction of these effects will be given subsequently with reference to the curves of Fig. 2.

The explanation thus far presented of the operation of the modulators 33a–33c, inclusive, has neglected the operation of the differentiating circuit 53, the rectifier 54 and the additional modulator tube 50b.

In order to improve the effectiveness of the modulator arrangement, specifically, so that the spurious effects on the edges of the reproduced objects are diminished, it may be desirable that the modulation of the 0.5–4 megacycle brightness component, being a nonindependent type of component, be made proportional to the magnitude of the first or higher derivatives of the color-signal component, the latter being an independent type of component, instead of being made proportional to the color-signal component itself. The units 53, 54 and the tube 50b serve such a purpose. The 0–0.5 megacycle color-signal component from one of the adder circuits 32a–32c, inclusive, is differentiated in the unit 53 and a unidirectional control signal is derived therefrom in the full wave rectifier 54. The latter signal is applied to an input circuit of the tube 50b, the level thereof being adjusted by the circuit including the diode 56b in a manner similar to that described with reference to the tube 50a. The tube 50b operates in a manner similar to that described with reference to the tube 50a except that the differentiated signal applied to the inner control electrode is effective in proportioning the brightness signals on the edges of an object. The signals developed by the tubes 50a and 50b are combined across the load resistor 52 and applied to the adder circuit 55 wherein they combine with the 0–0.5 megacycle color-signal component in the manner previously described.

Referring now to Fig. 2, the nature of the above-mentioned undesired effects and the manner in which they are reduced or substantially eliminated in accordance with the present invention, will now be further described.

Curves A–D, inclusive, and $A_1$–$C_1$, inclusive, of Fig. 2 represent the wave forms of certain signal components defining the color and high-frequency detail of a portion of a televised object; curves E–G, inclusive, similarly represent the reproduction of these color and detail signal components by prior receivers; while curves H–J, inclusive, similarly represent the reproduction of these signal components by a receiver in accordance with the present invention. Specifically, each curve represents the amplitude of a signal related to a color or brightness characteristic of the image as a portion of one horizontal line is traced across a colored pattern having black, white, black, red, and black vertical bars in the order mentioned. The signal components representative of the pattern as viewed by the cameras at the transmitter are represented by solid-line curves A, B, C, and D where curves A, B and C represent 0–4 megacycle information, respectively, of the green, red and blue primary color characteristics of the pattern while curve D represents only the 0.5–4 megacycle high-frequency detail thereof. The dashed-line curves $A_1$, $B_1$, $C_1$ represent the color information in the mutually independent 0–0.5 megacycle green, red and blue color components, respectively, translated through the color-television system, including both the transmitter and receiver, as previously discussed herein.

Curves E, F and G represent the visual effects developed on the image screens responsive, respectively, to the green, red and blue primary color signals in a conventional type of receiver, wherein the mutually independent 0–0.5 megacycle color components and the nonindependent 0.5–4 megacycle brightness components are combined additively in a linear manner. Thus each of these curves represents the resultant color signal developed by the combining operation. In such a receiver the white bar of the pattern is reproduced with reasonable fidelity since all three primary color signals, specifically, the green, red and blue signals as represented by the curves E, F and G, respectively, are utilized to produce white. Because all of the color signals are so utilized, any cross-talk effects therebetween are effectively canceled. However, when the red vertical bar of the pattern is reproduced, utilizing only the red color signal represented by curve F, the edges of the red bar are not sharp because of the low amplitude of the corresponding mixed-high component and undesired visual effects occur on the green and blue image-reproducing screens caused by the spurious green and blue signals occurring at the edges of the red bar and shown in curves E and G. No visual effects should occur on the green and blue image screens at this time, if the red bar in the pattern is to be faithfully reproduced. Nevertheless, these undesired effects do appear, being caused by the occurrence of the high-frequency brightness component, represented by curve D, which normally combines with the low-frequency color components as previously mentioned, in the green and blue signal-translating channels, causing the image-reproducing screens coupled thereto to respond as represented. More specifically, the 0.5–4 megacycle mixed-high brightness component as represented by curve D is continuously present in equal strength in all three color signal-translating channels in prior receivers. Therefore, in the reproduction operation under consideration, it causes green and blue visual effects to be developed in the reproduced image when no such effects should be present. These undesired effects optically combine with the properly reproduced red color developed on the red image screen to cause improper colors on the edges of the red bar of the pattern, specifically to cause color desaturation, contamination, or both, on these edges.

Curves H, I and J represent the visual effects developed on the green, red and blue image screens, respectively, in a receiver embodying the signal-translating system of the present invention, more specifically, in the receiver represented by Fig. 1 having a modulator represented by Fig. 1*a* but excluding the tube 50*b* and its associated circuit elements. No green and blue low-frequency color components are applied to the input of the modulators 33*a*–33*c*, inclusive, at this time to modulate the mixed-high brightness component therein. As a result no mixed-high brightness component is translated through either the green or blue signal-translating channel to develop undesired visual effects on either the green or blue image screens. The white bar of the pattern is again reproduced with reasonable fidelity, and in addition, since both low-frequency and high-frequency signals related to the red bar of the pattern are present only in the channel utilized to translate the red signals, the red bar is reproduced only on the red image screen.

An important characteristic of the present invention is that the intensity of the nonindependent mixed-high frequency brightness component is completely controlled at the receiver by the intensity of the mutually independent low-frequency color components. If there is no low-frequency color component present, no brightness component can be translated through the color channel related to that low-frequency color component. When there is a low-frequency color component present, the brightness component is translated through the color channel in proportion to the intensity of the low-frequency color component. Therefore, it may be said that the high-frequency brightness component, in a system in accordance with the present invention, is effectively a high-frequency color component since the intensity thereof is directly related to a color of the image as represented by a low-frequency color component.

The above description and explanation of the operation and the embodiment represented by Figs. 1 and 1*a* have been confined to a color-television system including both a transmitter and a receiver in which the color-signal components are transmitted as double side-band modulation signals of a subcarrier wave signal. Such modulation components are effectively independent of each other while the other video-frequency signals simultaneously translated through the system in a common pass band therewith are substantially nonindependent, being developed from a plurality of independent signals. These independent components are then utilized to control the proportioning of the dependent or mixed-high brightness components which will be combined with each of the independent components to develop the complete color signals. It should be understood that, though the teachings of the present invention are probably most effective when such double side-band color-signal transmission is utilized, the invention is not limited thereto. More specifically, the color-signal components that are transmitted and are subsequently derived at the receiver may have bandwidths greater than those that can be transmitted in a double side-band manner. Nevertheless, the utilization of such color-signal components to determine the proportion of the mixed-high brightness components to be utilized in each of the color channels diminishes the cross-talk effects caused in prior systems by permitting the mixed-high frequency components to be combined additively in a linear manner with the color-signal components. Though the degree of improvement which the present invention is capable of producing may not be obtained in a system wherein the color components are not entirely independent, nevertheless, the undesired cross-talk effects are substantially reduced.

*Description and explanation of operation of modulator arrangement of Fig. 1b*

There has previously been described herein a modulator circuit as represented by Fig. 1*a* for use in the apparatus 15 of Fig. 1. The modulation effects produced by the circuit of Fig. 1*a* may also be produced by an arrangement such as that of Fig. 1*b*.

The arrangement of Fig. 1*b* includes amplifiers 47*a*, 47*b* and 47*c*, individually coupled to corresponding ones of the adder circuits 32*a*, 32*b* and 32*c*, and each having an output circuit individually coupled to a separate cathode of a three-gun tricolor cathode-ray tube 35. The arrangement of Fig. 1*b* also includes a deflection amplifier 39 having an output circuit coupled through an auxiliary deflection winding 28 to ground. The input circuit of the amplifier 39 is coupled to terminals 26*a*, 26*a* in the output circuit of a unit such as the filter network 26 in the apparatus 15 of Fig. 1. Conventional deflection windings are also provided for the tube 35 having terminals 20 and 21 arranged to be connected to corresponding terminals 20 and 21 in the unit 15 of Fig. 1.

The cathode-ray tube 35 may be of the type more fully described in the article previously referred to in the RCA Review of June 1950, and includes an apertured mask 36 and a fluorescent screen 37 composed of an orderly array of small closely spaced luminous phosphor dots. These dots are arranged in triangular groups, each group including a dot capable of emitting green-colored light, a dot capable of emitting red-colored light and a dot capable of emitting blue-colored light. The cathodes of the tube 35, in combination with a conventional control electrode and anode, provide means for developing electron beams therein, there being one electron beam for each cathode. The auxiliary winding 28 provides one input circuit for the modulator arrangement including the tube 35 and is arranged to effect scanning velocity modulation of the electron beams in the cathode-ray tube, thereby to control that characteristic of the beam which relates to its lateral positioning in the tube. Each of the cathodes of the tube 35 provides an input circuit coupled to a different one of the signal-translating channels previously described and the potential of each cathode controls the intensity of the electron beam emitted therefrom.

Considering now the operation of the modulator arrangement of Fig. 1*b*, the 0–0.5 megacycle color signals representative of the colors green, red and blue, are individually translated through the adder circuits *32a–32c*, inclusive, and the amplifiers *47a–47c*, inclusive. These translated low-frequency color signals are applied to individual cathodes in the cathode-ray tube 35 to control the intensity of the electron beams emitted therefrom, the intensity modulation being representative of the individual color characteristics of the image, specifically, the green, red and blue characteristics thereof. The 0.5–4 megacycle mixed-high brightness component is translated through the deflection amplifier 39 to develop deflection potentials in the auxiliary deflection coil 28. The amplifier 39 may have over the pass band thereof a nonuniform signal-translating characteristic to compensate for any nonuniformity in the effective frequency response of the circuit including the winding 28.

The manner in which the 0–0.5 megacycle color signals applied to the cathodes of the tube 35 modulate and combine with the 0.5–4 megacycle brightness signals applied to the deflection winding 28 will now be described in more detail by considering the operation of one of the cathodes and the deflection winding 28. It may be assumed that the signal applied to the cathode coupled to the amplifier *47a* intensity modulates the electron beam emitted therefrom in a manner representative of the green color characteristic of the image. This intensity modulation is related only to the 0–0.5 megacycle portion of the complete green color signal. The 0.5–4 megacycle brightness component applied to the winding 28 as a scanning velocity modulation signal is arranged to act conjointly with the intensity modulation signal on this cathode effectively to develop a complete 0–4 megacycle green color signal. The modulation of the 0.5–4 megacycle component by the 0–0.5 component is effected in a manner similar to the sharpening effect more fully described in applicant's copending application Serial No. 179,122, entitled "Modifying the Transient Response of Image Reproducers," and filed August 14, 1950, now Patent No. 2,678,964, granted May 18, 1954. The higher frequency component has the effect of sharpening the edges where the high-frequency details of the image occur. It is seen that if no 0–0.5 megacycle green color signal is applied to the cathode, then regardless of the intensity of the brightness signal applied to the winding 28, there will be no visual effect reproduced on that portion of the screen 37 developing green. In other words, the effect of the brightness signal developed in the winding 28 in reproducing the image is proportional to the intensity of the electron beam as controlled by the independent low-frequency color signal applied to the cathode. Thus, the mutually independent 0–0.5 megacycle color signals are utilized in the modulator arrangement of Fig. 1*b* to determine the proportion of the nonindependent 0.5–4 megacycle mixed-high brightness signals which will be combined with each of the 0–0.5 megacycle color signals to develop the complete 0–4 megacycle color signal. As a result, the benefits of the invention, as previously described with reference to Fig. 1, are obtained in a modulator arrangement such as that represented by Fig. 1*b* in which the modulation is effected by a modulating action directly on the cathode-ray beam of the image-reproducing device.

*Description of apparatus of Fig. 3*

As previously mentioned, the receiver of Fig. 1 is arranged to be utilized in a dot-sequential type of band-sharing color-television system. It has also been mentioned that other types of band sharing systems may be employed to translate color-television information and the present invention is also applicable thereto. Fig. 3 represents apparatus for utilization in a receiver embodied in another type of band sharing system.

Referring now to Fig. 3, since units therein are similar to units in the embodiment of Fig. 1, corresponding units are designated by the same reference numbers. One signal-translating channel in the apparatus of Fig. 3 includes a filter network 40 having a pass band of approximately 1–4 megacycles coupled between the output circuit of the filter network 24 and an input circuit of the modulator **33*b*. Another signal-translating channel includes, in cascade between the filter network 24** and an amplifier *47b*, a filter network **43*b***, preferably having a pass band of 2.5–3.6 megacycles, an amplitude detector *44b*, a filter network **45*b* preferably having a pass band of 0–1.0 megacycle, and the modulator 33*b***. The units *43c, 44c, 45c, 33c*, and *47c*, comprise still another signal-translating channel, as does the unit *47a*. Units having the same numerals are similar in nature and the letter suffixes indicate the signal-translating channels of which the units are a part. The unit *43c* preferably has a pass band of 3.75–4.0 megacycles and the unit *45c* preferably has a pass band of 0–0.25 megacycle. There is also coupled between the network 24 and the modulator *33c*, a filter network 48 preferably having a pass band of 0.25–4.0 megacycles. The output circuits of the amplifiers *47a*, *47b*, *47c*, are coupled, respectively, to terminals *49a*, *49b*, *49c*, for connection to the electron-beam intensity control circuits of an image-reproducing device such as the device 16 of Fig. 1.

*Explanation of operation of apparatus of Fig. 3*

The apparatus of Fig. 3 is arranged to utilize a band sharing composite type of video-frequency signal including both brightness and color-signal components. The brightness component may have a bandwidth of 0–4 megacycles. In addition, the composite signal may include a 3.5 megacycle subcarrier wave signal single side band modulated by a 1 megacycle color-signal component representative of the red color characteristic of the image and may also include a 4 megacycle subcarrier wave signal modulated by a 0.25 megacycle color-signal component representative of the blue color of the image.

The 0–4 megacycle complete video signal of which the 0–1 megacycle component may represent the green color characteristic of the image, is translated directly through the amplifier *47a* for application through the terminal *49a* to that electron-beam intensity control circuit of the image-reproducing device which is effective to develop the green color of the image.

The single side-band modulated 3.5 megacycle subcarrier is translated through the network *43b* and the modulation components thereof are derived in the detector *44b* and translated through the filter network *45b*. These modulation components combine in the modulator *33b* with the 1–4 megacycle mixed-high brightness components translated through the network 40. The manner of this combination is fully described with reference to Fig. 1*a*, the 0–1.0 megacycle color component determining the proportion of the mixed-high brightness component to be combined therewith to develop a complete 0–4 megacycle red color signal. The latter signal is translated through the amplifier *47b* and applied through the terminal *49b* to that electron-beam intensity control circuit of the image-reproducing device which is effective to develop the red color of the image. In a similar manner, the 0–0.25 megacycle modulation components of the 4.0 megacycle subcarrier and representing the blue color of the image, are derived in the channel including the modulator *33c*. The 0–0.25 megacycle blue color components are combined with the 0.25–4 megacycle mixed-high brightness components translated through the network 48 in a nonlinear manner, as previously described, to develop the complete 0–4 megacycle blue color signal. This blue color signal is then applied through the terminal *49c* to that electron-beam intensity control circuit of the image-reproducing device which is effective to develop the blue color of the image.

It is seen that the apparatus of Fig. 3 is another embodiment of the present invention utilizing a different coding of the brightness and color-signal components and a different arrangement for deriving the color-signal components. Nevertheless, the apparatus utilizes the teachings of the invention to diminish the effect of cross talk between the nonindependent portions of the composite video-frequency signal. As previously, the substantially mutually independent modulation components of the 3.5 megacycle and the 4.0 megacycle subcarrier wave signals determine the proportion of the mixed-high components which will be combined with each thereof to develop the complete 0–4 megacycle color signal. It is also seen that such proportioning may be utilized in one or more of the color channels, though the modulators 33b and 33c are present only in two of the color channels of the apparatus of Fig. 3. A similar arrangement may be used in the green color-signal channel if desired.

*Description of apparatus of Fig. 4*

Thus far there have been described embodiments of the invention directed to reducing the undesired color effects caused by the linear combining of the three mutually independent color-signal components and the common high-frequency component, this reduction being effected by injecting the common high-frequency component into a particular color channel in proportion to the intensity of the independent color-signal component in that channel. While such a procedure reduces color cross talk, it may result in an incorrect amount of high-frequency energy being introduced into the color channels, particularly, when a color-signal component is being translated through only one of the channels and that component is of low, but not zero, intensity. A further improvement can be obtained if the common high-frequency component is injected into any color channel in proportion to the ratio of the independent color-signal component being translated through that channel and one-third the sum of the three color-signal components being separately translated through the channels. Such operation causes the modulation of the common high-frequency component to be substantially independent of the color intensity variations of the different color-signal components. The apparatus of Fig. 4 embodies this alternative feature of the present invention. Since many of the units of the apparatus of Fig. 4 are similar to units described with reference to the apparatus of Fig. 1, corresponding units of these figures are designated by the same reference numerals and analogous units by the same reference numerals with a factor of 400 added thereto.

Referring now to Fig. 4, one signal-translating channel comprises an amplifier 60 coupled between the filter network 24 and an input circuit of each of similar modulators 61a, 61b and 61c. The other signal-translating channels are analogous to those of Fig. 1. A filter network 429b, similar to the network 429a, and an inverse modulator or divider circuit 62, to be described more fully hereinafter with reference to Fig. 4a, are coupled in series between the output circuit of the network 24 and the input circuit of the network 429a. The unit 62 also has an input circuit coupled to the input terminals 25, 25 through a filter network 63 having a pass band of approximately 0–0.5 megacycle. The modulator 62 is arranged to divide the signal translated through the network 429b by the signal translated through the network 63 so that the 0–0.5 megacycle signals translated through the networks 431a, 431b and 431c are proportional only to the chromaticity or the color of the televised image and are independent of the brightness or intensity of such image, as will be explained in more detail hereinafter.

Referring now to Fig. 4a which represents the details of the inverse modulator or divider 62, an input terminal 64 is coupled through a phase inverter 66 and a condenser 67 to a control electrode, specifically the outer signal input grid which is of the remote cutoff type, of a mixer vacuum tube 68. A clamping diode 69 has its anode connected to the remote cutoff grid and its cathode connected to the cathode of tube 68. A second input terminal 65 of the unit 62 is coupled through a condenser 70 to a control electrode of the tube 68, specifically the inner signal input grid thereof, which is provided with a grid-leak resistor 71 and a bias battery C. The anode of the tube 68 is coupled through an anode load resistor 72 to a source of potential +B and to the output terminal 73 of the unit 62.

Referring again to Fig. 4, the output circuits of the modulators 61a, 61b and 61c are coupled through terminals 49a, 49b and 49c, respectively, to those electron-beam control electrodes of an image-reproducing device which are arranged to control the green, red and blue characteristics of the reproduced image. Such a device may be of a conventional type, as previously described herein. The modulators 61a, 61b and 61c have adjustable bias circuits in those input circuits coupled to the amplifiers 433a, 433b and 433c for a purpose to be described more fully hereinafter and have clamping diode circuits in the input circuits coupled to the amplifier 60 similar to the signal-level control circuits described with reference to the modulator of Fig. 1*a*.

*Explanation of operation of apparatus of Fig. 4*

Considering now the operation of the apparatus of Fig. 4, a 0–4 megacycle dot-sequential type of composite video-frequency signal is applied to the terminals 25, 25 translated through the network 24, amplified in the unit 60 and applied to an input circuit in each of the modulators 61a–61c, inclusive. The 3–4 megacycle composite color subcarrier component translated through the units 24 and 429b is applied to an input circuit of the inverse modulator 62. A 0–0.5 megacycle portion of the composite video-frequency signal is applied by the filter network 63 to another input circuit in the unit 62. The 3–4 megacycle composite color subcarrier component is effectively divided by the 0–0.5 megacycle component to develop a subcarrier signal in the output circuit of the unit 62 which does not include the low-frequency brightness signals normally included in such subcarrier signal. The manner in which this division is accomplished will now be described in more detail with reference to the circuit of Fig. 4*a*.

In a mixer tube of the type having a remote cutoff outer signal grid, such as the tube 68 of Fig. 4*a*, the $e_g$–$i_p$ curve of the remote cutoff grid resembles the curve of a negative inverse function. Therefore if a signal is applied to the remote cutoff grid, there will be developed on the anode a negative inverse signal of the applied signal. Since a conventional modulator normally produces an output proportional to the product of the applied signals, if a negative signal is applied to the remote cutoff grid by the phase inverter 66, the operation of the tube 68 is such that the resultant signal developed across the load resistor 72 represents the division of the signal applied to the terminal 65 by the signal applied to the terminal 64.

Referring again to Fig. 4, the 3–4 megacycle portion of this resultant signal is translated through the network 429a and the modulation components thereof are detected in the detector 30, in the manner previously described with reference to Fig. 1. Each of these components is translated through one of the channels including the networks 431a–431c, inclusive, and applied to one of the input circuits of the modulators 61a–61c, inclusive, wherein they function to control the amplitude of the brightness component of the color signals developed in the output circuits of these units. As will be demonstrated mathematically, the signals developed at the terminals 49a, 49b and 49c are color signals in which the color-signal components and the common high-frequency brightness component thereof have been combined in a nonlinear manner to effect a reduction in the probability of color cross talk in an image reproduced therefrom.

In the dot-sequential type of system for translating color-television signals, a monochrome or brightness component is translated which has the following composition:

$$M=\frac{1}{3}G+\frac{1}{3}R+\frac{1}{3}B \qquad (1)$$

where:

M represents the 0–4 megacycle brightness component of the composite video-frequency signal, and G, R, B represent, respectively, the green, red and blue signals each having a bandwidth of 0–4 megacycles.

In such a system, color-difference signals can be detected at 0°, 120° and 240° phase points of a cycle of the subcarrier wave signal and combined with the brightness signal M to give the desired color signals, as described in applicant's application Serial No. 164,114, previously referred to. The following color-difference signals are normally available in such a system:

$$x=\tfrac{2}{3}g_L-\tfrac{1}{3}r_L-\tfrac{1}{3}b_L \qquad (2)$$

at the 0° phase point, $$y=\tfrac{2}{3}r_L-\tfrac{1}{3}g_L-\tfrac{1}{3}b_L \qquad (3)$$

at the 120° phase point, and $$z=\tfrac{2}{3}b_L-\tfrac{1}{3}g_L-\tfrac{1}{3}r_L \qquad (4)$$

at the 240° phase point, where:

$x$, $y$, $z$ represent the normally detected color-difference components related, respectively, to the green, red and blue characteristics of the image, and $g_L$, $r_L$, $b_L$ are low-frequency components of the color signals G, R and B, respectively, having bandwidths of 0–0.5 megacycle in the embodiment being considered.

In the conventional receiver described in the application Serial No. 164,114, just referred to, the inverse modulator 62 is not utilized and the modulators 61_a_–61_c_, inclusive, are replaced by adder circuits which linearly combine the signals applied thereto. The output signals in such a conventional receiver for the three basic colors are thus $M+x$, $M+y$ and $M+z$. The monochrome or brightness component M can be considered to be:

$$M=m_L+m_H=\tfrac{1}{3}(g_L+r_L+b_L)+\tfrac{1}{3}(g_H+r_H+b_H) \qquad (5)$$

where:

$m_L$ is the 0–0.5 megacycle component of M, $m_H$ is the common high-frequency component of M having a frequency range of 0.5–4 megacycles, and $g_H$, $r_H$, $b_H$ represent the 0.5–4 megacycle components of the signals G, R and B.

Utilizing Equation 5 and Equations 2–4, inclusive, the three output signals may be defined:

$$M+x=g_L+m_H \qquad (6)$$

$$M+y=r_L+m_H \qquad (7)$$

$$M+z=b_L+m_H \qquad (8)$$

In other words, in the conventional system described in application Serial No. 164,114, three independent 0–0.5 megacycle narrow bandwidth signals $g_L$, $r_L$ and $b_L$ would be derived if only the double side-band portions of the color subcarrier are utilized and the common high-frequency signal $m_H$ would be combined with each in a linear manner.

Now considering the operation of the apparatus of Fig. 4, as a result of the operation of the unit 62, the signals $x'$, $y'$ and $z'$ developed in the output circuits of the detector 30 are defined as follows:

$$x'=\frac{x}{m_L} \qquad (9)$$

$$y'=\frac{y}{m_L} \qquad (10)$$

$$z'=\frac{z}{m_L} \qquad (11)$$

The modulators 61_a_–61_c_, inclusive, which are utilized in accordance with the teachings of the present invention in place of the linear adder circuits of prior apparatus, operate in such a manner as to develop from the product of the signal M and the signals defined by Equations 9, 10 and 11 three output signals equal to $g_L$, $r_L$ and $b_L$, respectively, over the low-frequency range of 0–0.5 megacycle. Since, as exemplified by the signals defined by Equations 2–4, inclusive, the signals $x'$, $y'$ and $z'$ may have either plus or minus values depending on the color being transmitted, a bias is required on the control electrodes of each modulator responsive to the signals $x'$, $y'$, $z'$ which will normally prevent the electrodes from driving the tube beyond cutoff when the signals applied thereto go negative. This bias should permit the electrodes to effect cutoff only at the greatest negative value of the signal, that is, at the time when the value indicates no color information representative of the color is being transmitted. For example, assume that the signals $g$, $r$, and $b$ have maximum potentials of 1 volt, then, according to Equation 2, the color-difference signal $x$ will have a value of +⅔ volt when saturated green is being transmitted and −⅔ volt when no green is being transmitted. The signal M, at these times, according to Equation 5, will have values of +⅓ and +⅔, respectively. Therefore the signal $x'$ as defined by Equation 9 will have values of +2 and −1 volts. It is desired for the purpose of effecting modulation of the signal M that the range +2 to −1 be converted to the range +3 to 0 so that proper modulation will occur. Therefore, a constant bias of +1 volt should be applied to the control electrode to which the signal $x'$ is applied to cause the range to be +3 to 0. Similar bias voltages are also required on the control electrodes responsive to the signals $y'$ and $z'$. With such biases, the effective input signals $p$, $s$, and $t$ on the input circuits under consideration, are determined by utilizing Equations 9, 10 and 11;

$$p=\frac{x}{m_L}+1 \qquad (12)$$

$$s=\frac{y}{m_L}+1 \qquad (13)$$

$$t=\frac{z}{m_L}+1 \qquad (14)$$

By utilizing the relationships of Equation 5 and Equations 2, 3 and 4 Equations 12, 13, and 14 reduce to the the form:

$$p=\frac{g_L}{m_L} \qquad (15)$$

$$s=\frac{r_L}{m_L} \qquad (16)$$

$$t=\frac{b_L}{m_L} \qquad (17)$$

Thus, it is seen that when the signal M is applied to the other input circuits of the modulators 61_a_–61_c_, inclusive, as determined by Equation 5 combined with Equations 15–17, inclusive, the modulators operate as defined by the following equations:

$$\frac{g_L}{m_L}M=g_L+m_H\left(\frac{g_L}{m_L}\right) \qquad (18)$$

$$\frac{r_L}{m_L}M=r_L+m_H\left(\frac{r_L}{m_L}\right) \qquad (19)$$

$$\frac{b_L}{m_L}M=b_L+m_H\left(\frac{b_L}{m_L}\right) \qquad (20)$$

Equations 18, 19, and 20 mathematically state that the nonindependent high-frequency brightness components $m_H$ are combined with the independent color-signal components $g_L$, $r_L$ and $b_L$ in a nonlinear manner. More specifically, the mixed-high brightness components $m_H$ are added to the independent low-frequency components $g_L$, $r_L$ and $b_L$ in proportion to the ratio of the amplitude of the particular color-signal component to the amplitude of the low-frequency components $m_L$ of the brightness signal. This is the result that is desired in accordance with the teachings of this additional feature of the invention, as just discussed.

Referring now to Fig. 5, the nature of the abovementioned undesired effects and the manner in which they are reduced or substantially eliminated, in accordance with the present invention as embodied in Fig. 4, will be further described. Curves A–J, inclusive, of Fig. 5 are analogous to correspondingly lettered curves of Fig. 2. Specifically, solid-line curves A, B and C represent, respectively, the 0–4 megacycle signals representative of the green, red and blue colors of the object being televised and curve D represents the signal relating to the high-frequency detail thereof. Dashed-line curves $A_1$, $B_1$ and $C_1$ represent the color information in the 0–0.5 megacycle color components translated through the television system, as previously described herein. It is to be remembered that under the condition of double side-band subcarrier transmission there is no cross talk between the signals represented by the curves $A_1$, $B_1$ and $C_1$ and such signals are effectively independent of each other. In terms of the parameters of the equations previously developed, curves A, B and C represent the signals G, R and B, repectively, while the curves $A_1$, $B_1$ and $C_1$ represent the signals $g_L$, $r_L$ and $b_L$, respectively. Curve D represents the common high-frequency brightness component $m_H$.

When the component $m_H$, as represented by curve D, is lineally combined with the components $g_L$, $r_L$ and $b_L$, as represented by the curves $A_1$, $B_1$ and $C_1$, respectively, as in prior arrangements, the color signals developed at the receiver for the colors green, red and blue are represented by the curves E, F and G, respectively. The color errors in the signals represented by these curves are obvious. For example, consider curve F representative of the red color signal. It is seen that the red vertical bar including a fine black vertical bar therein no longer has the sharp edges as represented by curve B. In addition, signals occur in the red channel which are related to the black and green bars following the red bar when no such signals should be present in the red channel. As previously discussed herein, the occurrence of such undesired signals results in undesired color effects in the reproduced image.

When the signal $m_H$, as represented by curve D, is combined with the color components $g_L$, $r_L$ and $b_L$ in a nonlinear manner, such as defined by Equations 18, 19, and 20 above, green, red and blue color signals represented by curves H, I and J, respectively, are developed. It is seen that the undesired color effects are substantially reduced. For example, with respect to the curve I representative of the red color signal, it is seen that this curve is a much more faithful reproduction of curve B than is curve F. An analysis of curves H, I and J indicates that in areas of constant chromaticity substantially no color error is developed in apparatus such as that represented by Fig. 4 regardless of the intensity of the color being reproduced. The color errors normally due to the improper occurrence of the mixed-high signals in the color channels in prior systems are effectively diminished by the nonlinear adding of the signals in the signal-combining arrangement of Fig. 4.

*Description and explanation of operation of modulator arrangement of Fig. 4b*

The embodiment of Fig. 4 has been described with reference to a group of individual modulators 61a–61c, inclusive. A modulator arrangement somewhat similar to that of Fig. 1*b* may be employed instead of the modulators 61a–61c, inclusive. Fig. 4*b* represents such a modulator arrangement.

Referring now to Fig. 4*b*, there is represented a cathode-ray tube for reproducing a color image from color signals applied to the input circuits thereof, Except for the input circuits to the tube, the tube may be of a conventional type, as previously described. A plurality of cathodes, each a part of a gun structure for developing an electron beam, are connected in common through a terminal 89 to a unit such as the amplifier 60 of Fig. 4. The tube also includes a plurality of deflection circuits, one for each of the electron beams, as represented by the pairs of deflection electrodes 80, 81, and 82, each pair having effectively a biasing potential as represented by −C′, −C″, and −C‴, coupled thereacross to bias one deflection electrode of a pair, with respect to the other. The variable resistors 83a–83c, inclusive, are each coupled across one of the batteries C′, C″, and C‴ to permit adjustment of the bias. The mean potential of the pairs of electrodes is approximately that of the conventional screen electrode of the tube. As described with reference to the apparatus of Fig. 4, the bias developed across each pair of electrodes is to compensate for the possible negative values of the color-difference signals and is of sufficient value to do so. One of the deflection electrodes of each pair is connected to a corresponding one of the amplifiers 433a–433c, inclusive, through the terminals 84a, 84b, and 84c. The pairs of deflection electrodes 80, 81, and 82 have individually associated therewith apertured discs 85, 86, and 87 respectively. Each disc is positioned between the pair of electrodes and the screen of the cathode-ray tube, the electron beam being arranged to pass through the aperture thereof.

In operation, each of the beams developed by the individual cathodes is translated between a pair of deflection electrodes and through the aperture in one of the discs 85–87, inclusive. The brightness signal M is applied to the cathodes of the cathode-ray tube and the modified color-difference components $x'$, $y'$, and $z'$ of Equations 9, 10, and 11 are individually applied across the deflection electrodes of the pairs 80–82, inclusive, respectively. The bias applied to each of the pairs of deflection electrodes from the corresponding one of the voltage dividers 83a, 83b, and 83c is such as is analogous to the bias discussed with respect to Fig. 4. It is seen that, as the components $x'$, $y'$ and $z'$ are applied to the different pairs of deflection electrodes, the effective instantaneous density of each of the beams translated through the apertures in the discs 85–87, inclusive, at the screen of the tube is controlled by the degree of lateral displacement of the beam due to the amplitude of the applied color-signal component. The controlling effect of each of the color-signal components is such that, if one of the colors is absent from the reproduced image, the color-signal component representing that color will cause the beam related thereto to be deflected to such an angle as to permit no electrons to be translated through the aperture of the disc associated with that beam. If the same color is to appear as a saturated color in the reproduced image, the maximum portion of the beam is translated through the aperture and applied to the image screen. It is thus seen that the brightness signal M applied to the cathodes of the tube is combined with each of the modified color-signal components $x'$, $y'$, and $z'$ derived from detector 30 and applied to the deflection electrodes 81, 81 and 82 of the tube in proportion to the ratio of the amplitude of the particular color-signal component to the amplitude of the low-frequency brightness component $m_L$ as defined by the Equations 18, 19, and 20 above. The cathode-ray tube of Fig. 4*b* serves the dual function of effecting the proper combining of the color-signal components and the brightness component and of reproducing the color image.

*Description of transmitter of Fig. 6*

In describing and explaining the operation of the apparatus of Fig. 4, there was discussed an arrangement for effectively dividing the subcarrier wave signal by the low-frequency brightness component, complementary to the operation occurring in the modulators 61*a*, 61*b* and 61*c*. If this division occurs in the transmitter of the color-television system instead of at the receiver, as described, the color errors resulting from single side-band transmission of the modulated color subcarrier can be further reduced. In the apparatus of Fig. 1, the modulated color subcarrier was assumed to be transmitted with side bands of 0–0.5 megacycle and occupied the range of 3–4 megacycles in the system pass band in an overlapping manner with the 3–4 megacycle brightness information. In order to improve the color detail in a reproduced image, it may be desirable to increase the bandwith of the color-signal components and to transmit a modulated color subcarrier having frequencies in the range of 2–4 megacycles, single side-band transmission being utilized for those signals representative of the improved color detail. As previously mentioned, over the single side-band region, amplitude and phase modulation of the subcarrier are not distinguishable and thus, over this region, any amplitude change of the modulated color subcarrier produces an undesired color error in the image. In the so-called dot-sequential system, the amplitude of the color subcarrier is proportional to both color saturation and brightness. For example, even if the chromaticity of an image is momentarily constant, the modulated color subcarrier varies in amplitude when the brightness of the color of constant chromaticity is changed and color errors therefore result. In the apparatus now to be described with reference to Fig. 6, the brightness variation is divided out of the modulated color subcarrier signal before it is transmitted through the single side-band channel and thus the color errors normally developed due to brightness variations are substantially eliminated.

Referring now to Fig. 6, the transmitter there represented comprises a signal-developing apparatus 90 having output circuits individually coupled to a plurality of filter networks 91*a*, 91*b* and 91*c*, each preferably having pass bands of 0–1.5 megacycles. Each of these output circuits of the unit 90 is also coupled to an adder circuit 92. A color synchronizing output circuit 90*a* of the unit 90 is coupled to a color wave-signal generator 93, this being the master generator for the controlled generator 34 of the receiver, previously described with reference to Figs. 1 and 4. Each of the output circuits of the units 91*a*, 91*b* and 91*c* is individually coupled to one of the input circuits of a synchronous modulator 94, the output circuit of which is coupled in cascade with a filter network 106, an inverse modulator or divider 95, a second filter network 96, both units 106 and 96 preferably having a pass band of 2–4 megacycles, and an adder circuit 97. The unit 92 is coupled through a filter network 98, preferably having a pass band of 0–4 megacycles, to an input circuit of the adder circuit 97 and through a filter network 99, preferably having a pass band of 0–1.5 megacycles, to an input circuit of the divider 95. The output circuit of the unit 97 is coupled through a power amplifier 100 to a signal-transmission apparatus 101.

The unit 90 may comprise a conventional unit for developing from an image, signals related to the colors thereof. Specifically, the unit 90 may include electronic camera means for scanning an image focused on the screen of the camera to develop individual color signals related to the green, red and blue color characteristics of the image. The unit 90 may also include synchronizing circuits for controlling the horizontal and vertical scanning of the image, and, through circuit 90*a*, the frequency of the generator 93, and the necessary sources of blanking potential. The color output signals of the unit 90 are individually related to the green, red and blue color characteristics of the image. The synchronous modulator 94 is complementary to the synchronous detector 30 of Fig. 5 and is arranged to have the individual color-signal components effectively modulate a plurality of color subcarrier wave signals, each having a frequency of 3.5 megacycles and having phase relationships of 0°, 120°, and 240° to each other. The resultant modulated subcarrier is a composite type of subcarrier wave signal. A more detailed description of a device of the type of unit 94 is presented in applicant's copending application Serial No. 164,114 referred to previously. The inverse modulator 95 is effectively a divider circuit in which one signal applied thereto is divided by another signal applied thereto and is similar to the circuit of Fig. 4*a*.

*Operation of transmitter of Fig. 6*

Referring now to the operation of the transmitter of Fig. 6, the unit 90, by conventional well-known means, causes an image to be focused on one or more target screens, the images formed thereon being related in a predetermined manner to the primary colors of the object being televised. These images are then scanned by conventionally developed and controlled electron beams to develop individual color signals related respectively to the green, red and blue color characteristics of the image. These signals are individually applied to the separate input circuits of the networks 91*a*, 91*b* and 91*c* and are collectively applied to separate input circuits of the adder circuit 92. The 0–1.5 megacycle portions thereof, having been individually translated through the networks 91*a*, 91*b*, and 91*c*, are individually utilized effectively to modulate in the synchronous modulator 94 different ones of a plurality of subcarrier wave signals applied thereto by the generator 93, each of the subcarriers having the same frequency of 3.5 megacycles but having phase relationships of 0°, 120° and 240°. The developed modulated subcarrier wave signal is a composite subcarrier and is sometimes designated as the composite color-signal component of a composite video-frequency signal. It is applied to the inverse modulator circuit 95.

The individual color signals applied to the adder circuit 92 are combined therein to develop a brightness component which is translated through the network 98, applied to the adder circuit 97 and the 0–1.5 megacycle portion thereof applied through the filter network 99 to the unit 95. In the unit 95, the 0–1.5 megacycle brightness component effectively divides out the 0–1.5 megacycle brightness variations inherently present in the modulated subcarrier wave signal to develop a resultant subcarrier wave signal including only chromaticity information. The resultant subcarrier wave signal with its lower side band of 2–3.5 megacycles and the 3.5–4 megacycle portion of its upper side band is translated through the network 96 and applied to an input circuit of the adder circuit 97 wherein it is combined with the brightness component also applied to the unit 97, as previously described, to develop a composite video-frequency signal which is translated through the power amplifier 100 and applied to the signal-transmission apparatus 101. The unit 101 effects the transmission of the composite video-frequency signal and may for such purpose utilize it to modulate a high-frequency wave signal for radiation or apply it to a broad-band transmission line.

It has been stated that the low-frequency portion of the brightness component is effectively divided out of the modulated subcarrier wave signal in the divider circuit 95. If this division were mathematically perfect, the divider would require a very large gain approaching infinite gain as the brightness signal approaches zero amplitude. However, for compatibility purposes, it may be desirable to have the intensity of the subcarrier wave signal approach or become zero when the brightness level of the image falls to some low but finite value. If such is desired, the parameters of the divider circuit 95 are so proportioned, in a conventional manner, that the gain thereof approaches a chosen finite value for low brightness levels.

The signal produced by the transmitter of Fig. 6 can be utilized by the receiver of Fig. 4 if the inverse modulator 62 thereof is replaced by a conventional amplifier, and filter network 63 is eliminated. Such a receiver will reproduce a color image in which the color cross talk due to the common high-frequency components and due to single side-band transmission of the color subcarrier has been substantially reduced by the nonlinear combining of signals as described herein.

*Description of apparatus of Fig. 7*

Referring now to Fig. 7, there is represented a signal-translating system for use in a receiver operating on signals from the transmitter of Fig. 6 and embodying only that feature of the invention which eliminates the color cross talk due to low-frequency brightness fluctuations of the subcarrier wave signal while still adding the mixed-high components in a linear manner. Since the system of Fig. 7 bears some relationship to the system of Fig. 1, similar units thereof are designated by similar reference numerals and analogous components by reference numerals with a factor of 700 added. Each of the signal-translating channels for translating color information includes one of modulators **761*a*, 761*b* and 761*c* coupled between the corresponding one of the networks 731*a*, 731*b* and 731*c* and the corresponding one of the amplifiers 733*a*, 733*b* and 733*c*. The filter network 63 is coupled between the unit 24 and an input circuit of each of the modulators 761*a*, 761*b* and 761*c*. A filter network 726 is coupled through an isolation amplifier 110 arranged to develop electrically isolated signals in separate output circuits thereof, and these separate output circuits are individually coupled to different ones of the adder circuits 732*a*, 732*b* and 732*c***.

*Explanation of operation of apparatus of Fig. 7*

Considering now the operation of the signal-translating system of Fig. 7, the 0–4 megacycle portion of the composite video-frequency signal is applied to the terminals 25, 25 and the 1.5–4 megacycle portion of the brightness component is translated through the unit 726. Isolated but similar 1.5–4 megacycle portions of the brightness component are developed and amplified in the unit 110 and individually applied to the adder circuits **732*a*, 732*b* and 732*c*. The 2–4 megacycle portion of the composite video-frequency signal including the composite color-signal component is applied to the detector 30 wherein the components representative of the chromaticity are derived in a manner similar to that previously described for color-signal components with reference to other embodiments of the invention, and the 0–1.5 megacycle portion of each of the derived components is individually translated through a different one of the networks 731*a*, 731*b* and 731*c* and applied to one of the modulators 761*a*, 761*b* and 761*c*. The 0–1.5 megacycle portion of the brightness component is translated through the network 63 and also applied to an input circuit in each of the modulators 761*a*, 761*b* and 761*c*. A modulation operation complementary to that which occurred at a transmitter such as that represented by Fig. 6 occurs in these modulators to restore the low-frequency brightness component to each of the components representative of the chromaticity of the image to form color-signal components. The color-signal components are then translated through individual ones of the amplifiers 733*a*, 733*b* and 733*c* and are individually combined in the adder circuits 732*a*, 732*b* and 732*c*** with the mixed-high portion of the brightness signal. The color signals in the output circuits resulting from such combination may then be utilized in an image-reproducing device such as that described with reference to Fig. 1.

It is seen that the undesired effects of the low-frequency brightness components on the color signals which are developed from signals transmitted as single side-band modulation signals are substantially eliminated in apparatus such as that represented by Fig. 7. The system of Fig. 7 overcomes only this deficiency. If correction is desired for the effects caused by the linear combination of the mixed-high brightness signals and the color-signal components, an apparatus such as that of Fig. 4 with the inverse modulator replaced by an amplifier may be utilized.

It should be understood that, if the low-frequency brightness component is not entirely canceled from the subcarrier wave signal at the transmitter, as previously described with reference to Fig. 6, then the modulation of the low-frequency brightness component and the color-signal component in the units **761*a*, 761*b* and 761*c*** should be proportioned to complement the operation at the transmitter in order that other errors are not introduced.

*Description and explanation of operation of apparatus of Fig. 7a*

The apparatus of Fig. 7*a* is related to the apparatus of Fig. 7, both effecting the same result in different manners. In view of this similarity, similar units in each are designated by the same reference characters. In the apparatus of Fig. 7*a*, a filter network 111, having a pass band of approximately 2–4 megacycles and a modulator 112 are coupled between the terminals 25, 25 and the network 729. The units 111 and 112 replace the modulators **761*a*, 761*b* and 761*c* so that the output circuits of the networks 731*a*, 731*b* and 731*c* may be coupled individually to adder circuits, such as the units 732*a*, 732*b* and 732*c*** of Fig. 7.

In the apparatus of Fig. 7*a*, the combining of the color-signal components and the low-frequency brightness component is effected by combining the composite color-signal component, that is, the modulated subcarrier wave signal, with the low-frequency brightness component before the color-signal components are derived from the wave signal. Since the modulation operation results in double side-band effects in the output circuit of the modulator, the undesired effects resulting from single side-band transmission of the color-signal components as in prior systems are avoided. The results obtained in either Fig. 7 or Fig. 7*a* are substantially the same.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A color-television apparatus for translating a video-frequency signal having components representative of both the brightness and color characteristics of an image, which components if separated and recombined in a linear manner cause undesired color effects to occur in an image reproduced therefrom by an image-reproducing system, comprising: a first signal-translating channel responsive to said video-frequency signal for deriving therefrom and translating a first signal representative of at least a portion of said brightness characteristic; a second signal-translating channel responsive to said video-frequency signal for deriving therefrom and translating a second signal representative of at least a portion of said color characteristic; means coupled to each of said signal-translating channels for developing an output signal representing the multiplication product of said first and said second translated signals; and means for utilizing said output signal for reproducing an image.

2. A color-television apparatus for translating a video-frequency signal having components representative of both the brightness and color characteristics of an image, which components if separated and recombined in a linear manner cause undesired color effects to occur in an image reproduced therefrom by an image-reproducing system, comprising: one signal-translating channel responsive to said video-frequency signal for deriving therefrom and translating a first signal representative of at least a portion of said brightness characteristic; a plurality of other signal-translating channels each responsive to said video-frequency signal for deriving therefrom and translating another signal representative of at least a portion of said color characteristic; a plurality of means each coupled to said one channel and one of said other channels for developing an output signal representing the multiplication product of said first translated signal and one of said other translated signals; and means for utilizing said output signals for reproducing an image.

References Cited in the file of this patent

UNITED STATES PATENTS

| | | |
|---|---|---|
| 2,375,966 | Valensi | May 15, 1945 |
| 2,509,038 | Goldsmith | May 23, 1950 |
| 2,554,693 | Bedford | May 29, 1951 |
| 2,587,074 | Sziklai | Feb. 26, 1952 |
| 2,627,547 | Bedford | Feb. 3, 1953 |
| 2,627,549 | Kell | Feb. 3, 1953 |
| 2,657,253 | Bedford | Oct. 27, 1953 |
| 2,716,151 | Smith | Aug. 23, 1955 |
| 2,798,114 | Schlesinger | July 2, 1957 |

FOREIGN PATENTS

| | | |
|---|---|---|
| 698,104 | Great Britain | Oct. 7, 1953 |